United States Patent
Sugiura et al.

(10) Patent No.: US 10,663,296 B2
(45) Date of Patent: May 26, 2020

(54) SURVEYING INSTRUMENT

(71) Applicant: TOPCON CORPORATION, Tokyo (JP)

(72) Inventors: Akinobu Sugiura, Tokyo (JP); Masahiro Ohishi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 381 days.

(21) Appl. No.: 15/878,830

(22) Filed: Jan. 24, 2018

(65) Prior Publication Data
US 2018/0245917 A1    Aug. 30, 2018

(30) Foreign Application Priority Data
Feb. 28, 2017  (JP) ................. 2017-035922

(51) Int. Cl.
*G01C 15/00* (2006.01)
*G01S 7/00* (2006.01)
*G01S 7/481* (2006.01)
*G01C 3/08* (2006.01)
*G01S 17/08* (2006.01)

(52) U.S. Cl.
CPC ........... *G01C 15/004* (2013.01); *G01C 3/08* (2013.01); *G01C 15/002* (2013.01); *G01S 7/4812* (2013.01); *G01S 17/08* (2013.01)

(58) Field of Classification Search
USPC ............................. 356/4.01, 5.01
See application file for complete search history.

(56) References Cited

U.S. PATENT DOCUMENTS

| | | | |
|---|---|---|---|
| 6,356,344 B1 | 3/2002 | Ohishi et al. | |
| 6,587,644 B2 * | 7/2003 | Takase | G03B 13/02 396/149 |
| 7,177,015 B2 * | 2/2007 | Ohtomo | G01C 15/002 356/4.01 |
| 7,408,152 B2 * | 8/2008 | Holle | H01J 49/164 250/281 |

(Continued)

FOREIGN PATENT DOCUMENTS

| | | |
|---|---|---|
| JP | 2004212059 A | 7/2004 |
| JP | 4328917 B2 | 9/2009 |

*Primary Examiner* — James R Hulka
(74) *Attorney, Agent, or Firm* — Roberts Calderon Safran & Cole P.C.

(57) ABSTRACT

Provided is a surveying instrument including a light emitting section for emitting distance measuring light having an intensity distribution in which an intensity is high at the center and it became lower as approaching the periphery, a light receiving section for receiving the distance measuring light via a measurement object; and a distance-measurement optical system for guiding the light to the light receiving section via the measurement object. The surveying instrument performs a prism-mode and non-prism-mode measurements. The optical system includes an aperture diaphragm arranged in a distance-measurement optical path during the prism-mode-measurement. An opening of the aperture diaphragm has widths of greater than 0 and not greater than 0.5 times the full width at half maximum of the intensity distribution in a cross-section of non-prism-distance-measurement beam in the horizontal and vertical direction.

12 Claims, 11 Drawing Sheets

(56) References Cited

U.S. PATENT DOCUMENTS

| | | | | |
|---|---|---|---|---|
| 7,576,911 | B1* | 8/2009 | Larimer | G02B 21/086 |
| | | | | 359/385 |
| 9,036,254 | B2* | 5/2015 | Hein | G02B 21/06 |
| | | | | 359/368 |
| 9,955,128 | B2* | 4/2018 | Ashida | H04N 5/23212 |
| 2002/0036264 | A1* | 3/2002 | Nakasuji | G01N 23/225 |
| | | | | 250/306 |
| 2002/0122667 | A1* | 9/2002 | Takase | G03B 13/02 |
| | | | | 396/382 |
| 2003/0011745 | A1* | 1/2003 | Molebny | A61B 3/1015 |
| | | | | 351/215 |
| 2004/0125357 | A1 | 7/2004 | Ohtomo et al. | |
| 2005/0007551 | A1* | 1/2005 | Wakil | A61B 3/107 |
| | | | | 351/205 |
| 2006/0138343 | A1* | 6/2006 | Nakasuji | G01N 23/225 |
| | | | | 250/440.11 |
| 2006/0169914 | A1* | 8/2006 | Holle | H01J 49/164 |
| | | | | 250/423 P |
| 2013/0342902 | A1* | 12/2013 | Krueger | G02B 21/245 |
| | | | | 359/383 |
| 2014/0111773 | A1* | 4/2014 | Itoh | A61B 3/165 |
| | | | | 351/212 |
| 2014/0192408 | A1* | 7/2014 | Hein | G02B 21/086 |
| | | | | 359/390 |
| 2016/0286176 | A1* | 9/2016 | Ashida | H04N 5/23212 |
| 2017/0315039 | A1* | 11/2017 | Beil | G01N 15/0227 |

\* cited by examiner

Table 1 Comparison of intensity distributions of beam cross sections of Example 1 and Comparative Example 1

| | Comparative Example 1 | Example 1 |
|---|---|---|
| Profile of beam immediately after being emitted from light emitting section (Display range : □10 mm) | FWHMh, FWHMv | 0.5 × FWHMh, 0.5 × FWHMv |
| Profile of beam at 100 m from light emitting section (Display range : □10 mm) | | |
| Intensity distribution of beam in horizontal direction at 100 m from light emitting section (Display range : □10 mm) | 22mm | 60mm = 2' |

Fig. 7B

Table 2 Comparison of beam profiles
of Example 2 and Comparative Example 1

| | Comparative Example 1 | Example 2 |
|---|---|---|
| Profile of beam immediately after being emitted from light emitting section (Display range : □10 mm) |  FWHMh, FWHMv |  0.5 × FWHMh, 0.5 × FWHMv |

SURVEYING INSTRUMENT

CROSS-REFERENCE TO RELATED APPLICATIONS

The present application claims priority under 35 U.S.C. § 119 to Japanese Patent Application No. 2017-035922 filed Feb. 28, 2017. The contents of this application are incorporated herein by reference in their entirely.

BACKGROUND OF THE INVENTION

Field of the Invention

The present invention relates to a surveying instrument by which it is possible to measure a distance to an object to be measured by use of a laser beam.

As disclosed in Japanese Unexamined Patent Application Publication No. 2004-212059, a single surveying instrument which has a prism distance-measurement function in which a distance to an object to be measured is measured by using a reflecting prism for reflecting distance measuring light as well as a non-prism distance-measurement function in which the distance to the object is measured by using distance measuring light directly irradiated to the object with the distance measuring light is known.

In such instrument, during the non-prism mode measurement, the distance measuring light is required to have high output. So, it is necessary to use an optical system configured to receive as much light flux emitted from the light source as possible to have enhanced light utilization efficiency. On the other hand, during the prism-mode measurement, the distance measuring light is not required to have a power as much as that for the non-prism-mode measurement. In addition, the intensity of the laser beam is limited for reasons such as safety, the output power is lowered by an attenuation filter or the like.

However, the prism-mode measurement by use of the optical system having the enhanced light utilization efficiency designed for the non-prism mode measurement may lead to increase in the deviation of the distance value (hereinafter referred to as "mispointing error"). The mispointing error is caused by the fact that the reflecting prism slightly deviates from the intensity center of the irradiated distance measuring light.

As a means for solving this problem, a surveying instrument disclosed in Japanese Patent Application Laid-Open No. 2004-212059 is provided with a mixing device that mixes light emitted from a light source. An example of the mixing device includes one disclosed in Japanese Patent Specification No. 4,328,917. However, such mixing device requires a phase plate, a driving means for rotating the phase plate, an optical fiber, a lens for condensing light on the optical fiber, etc., thereby resulting in complication of the configuration.

SUMMARY OF THE INVENTION

Problems to be Solved by the Invention

The inventors studied the cause of the mispointing error. The study will be described with reference to FIG. 9. In the non-prism-mode measurement, the non-prism-distance-measurement beam Bn of distance measuring light is required to have high output. So, the non-prism-distance-measurement beam Bn is taken by a collimating lens 13 with high NA (number of apertures) together with peripheral light from a light source 12. Then, the diameter D of the non-prism-distance-measurement beam Bn is limited by an aperture diaphragm 14 to a larger beam diameter for non-prism measurement to be diffraction limit light to be emitted. The intensity distribution of the non-prism-distance-measurement beam Bn shows what is called a Gaussian distribution, as shown in the graph on the center of the figure, where the intensity is high in the center of the beam and it becomes lower as approaching to a periphery. So, the inventors measured the distance by use of the non-prism-distance-measurement beam Bn. As a result, they found there was a correlation between the beam intensity and measured distance value that the lower the intensity compared with that in the center of the beam was, the greater the error of the distance value was, as illustrated in the graph on the left side of FIG. 9. Further, at a long distance where a reflecting prism is measured, the size of the reflecting prism is relatively small with respect to the size of the beam of the distance measuring light. Accordingly, if the reflecting prism deviates from the intensity center of the beam of the distance measuring light, the measurement is performed by use of the light at a periphery region with lower intensity. Thus, deviation in light emission timing of the light source with respect to the internal reference signal based on the reference light occurs within the non-prism-distance-measurement beam Bn. Measured distance values disperse due to the variation of the time differences between the light emission timings and the internal reference signals depending on the position in the beam of the light irradiated to and reflected from a measured object depending on the position in the beam, thereby resulting in the mispointing error.

From the above, the inventors propose the present invention on the basis of the idea that insertion of an aperture diaphragm into the optical path of the distance measuring light to equalize the intensity in the beam to be used for measurement can reduce the mispointing error without the need for a complicated configuration.

The present invention has been made in view of such circumstances. An object of the present invention is to provide an art to reduce a mispointing error with a simple means and without the need for a complicated device.

Means of Solving the Problems

In order to solve the above problems, according to one aspect of the present invention, a surveying instrument includes a light emitting section for emitting distance measuring light having an intensity distribution in which the intensity is high at a center and it becomes lower as approaching a periphery, a light receiving section for receiving the distance measuring light via a measurement object; and a distance-measurement optical system for guiding the distance measuring light to the light receiving section via the measurement object. The surveying instrument performs a prism-mode measurement and a non-prism-mode measurement. The distance-measurement optical system includes an aperture diaphragm. The aperture diaphragm is arranged in a distance-measurement optical-path during the prism mode measurement. An opening of the aperture diaphragm has a horizontal width of greater than 0 and not greater than 0.5 times a full width at half maximum of the intensity distribution in a horizontal cross section of a non-prism measurement beam. The opening of the aperture diaphragm has a vertical width of greater than 0 and not greater than 0.5 times a full width at half maximum of the intensity distribution in a vertical cross section of the non-prism measurement beam.

According to another aspect of the present invention, a surveying instrument includes a light emitting section for emitting distance measuring light having an intensity distribution in which the intensity is high at a center and it becomes lower as approaching a periphery, a light receiving section for receiving the distance measuring light via a measurement object; and a distance-measurement optical system for guiding the distance measuring light to the light receiving section via the measurement object. The surveying instrument performs a prism-mode measurement and a non-prism-mode measurement. The distance measurement optical system includes an aperture diaphragm. The aperture diaphragm is arranged in a distance-measurement optical path during the prism mode measurement. The aperture diaphragm limits a prism-distance-measurement beam to have an intensity of not less than 84% of a center intensity of a non-prism-distance-measurement beam.

In the above aspects, it is preferable the horizontal width Wh and the vertical width Wv of the prism-distance-measurement beam respectively meet the following inequalities:

$$3\times10^{-4} \leq \lambda/Wh < 1, \text{ and}$$

$$3\times10^{-4} \leq \lambda/Wv < 1,$$

wherein λ represents a wavelength of the distance measuring light.

Also, in the above aspects, it is preferable that a concave lens be configured to be inserted into the distance-measurement optical path together with the aperture diaphragm during the prism-mode measurement.

Also, in the above aspects, it is preferable that the aperture diaphragm be formed in a rectangular shape.

Also, in the above aspects, it is preferable that the aperture diaphragm be formed in an ellipse shape.

Effects of the Invention

With the surveying instrument according to the aspects of the present invention, it is possible to provide an art to reduce a mispointing error by using simple means without the need for complexed devices.

BRIEF DESCRIPTION OF THE DRAWINGS

FIG. 7B is a table comparing intensity distributions of beam cross sections between Example 1 of the invention and Comparative Example 1;

DESCRIPTION OF THE EMBODIMENTS

Hereinafter, preferred embodiments of the present invention are described with reference to the drawings.

First Embodiment

Figure 1:
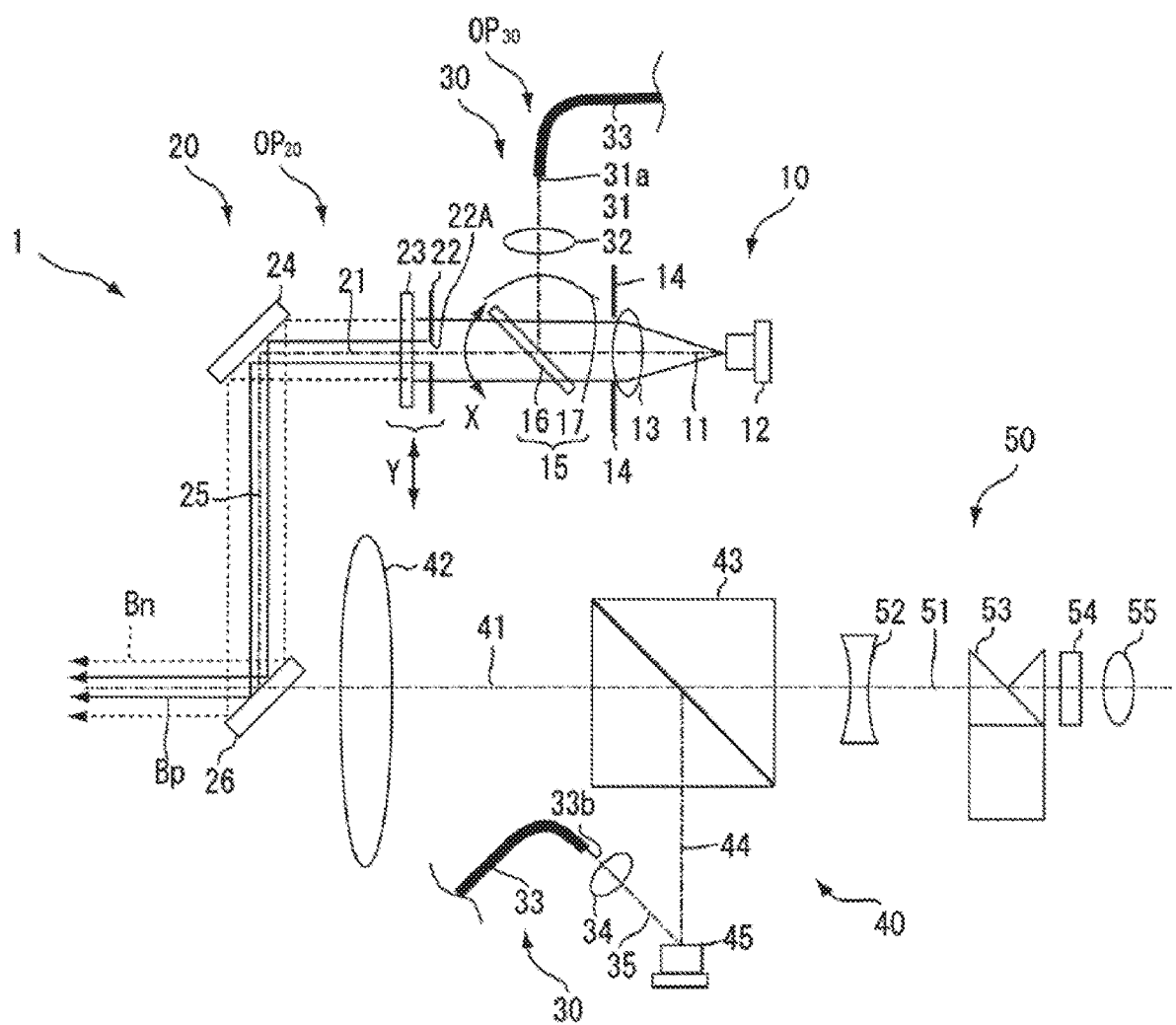
FIG. 1 illustrates a configuration of an optical system in a surveying instrument according to a first embodiment of the present invention.

FIG. 1 illustrates an optical system of a surveying instrument 1 according to the first embodiment of the present invention. The surveying instrument 1 is a total station and is provided with a light emitting section 10, a distance-measurement optical system 20, a reference optical system 30, a light receiving section 40, and an ocular optical system (telescope) 50.

First, the light emitting section 10 will be described. The light emitting section 10 has an emission optical axis 11. Arranged on the emission optical axis 11 are a light source 12, a collimating lens 13, an aperture diaphragm for non-prism-mode measurement 14, and a shutter unit 15 in such a manner as to be aligned with respective optical axes. The light source 12 is a laser light emitting element which emits visible light with a wave length of 690 nm as a distance measuring light. The collimating lens 13 is a lens which collimates light from the light source 12 to lead the light toward the shutter unit 15 in a form of parallel light. The aperture diaphragm for non-prism measurement 14 is a diaphragm made of a black board having an opening with, for example, rectangular or circular shape, to limit the beam diameter of the distance measuring light to be adapted for the non-prism-mode measurement. The shutter unit 15 includes a fixed beam splitter 15 and a shield 17 movable in the direction indicated by the arrow X by an actuator (not shown). The shutter unit 15 shields with the shield 17 either one of the distance-measurement optical-path in which the light passes through the distance-measurement optical system 20 or the reference optical path in which the light passes through the reference optical system 30 to switch the optical paths.

Next, the distance-measurement optical system 20 will be described. The distance-measurement optical system 20 has a distance-measurement optical axis 21 aligned with an extension line of the emission optical axis. Arranged on the distance-measurement optical axis 21 are an aperture diaphragm for prism-mode measurement 22 (hereinafter referred to simply as "aperture diaphragm"), a dimming member 23, a first deflecting mirror 24. A second deflection mirror 26 is arranged on a reflection optical axis 25 of the first deflecting mirror 24 to be aligned with the reflection optical axis 25. An example of the aperture diaphragm 22 is a black board having a rectangular opening, but not limited to this. The aperture diaphragm 22 will be described in detail below.

The dimming member 23 is what is called an ND (neutral density) filter, and attenuates the light quantity of the distance measuring light to be suitable for a prism-mode distance measurement. Both the aperture diaphragm 22 and the dimming member 23 are connected to an actuator (not shown) and configured in such a manner as to retract from the distance-measurement optical-path $OP_{20}$ when a non-prism distance measurement is performed and to be inserted into the distance-measurement optical-path $OP_{20}$ when a prism mode measurement is performed. The first deflection mirror 24 and the second deflection mirror 26 may be any mirrors that reflect light, and mirrors totally reflecting light or dichroic mirrors may be used for the deflection mirrors.

The reference optical system 30 is provided between the light emitting section 10 and the light receiving section 40 described later and have a reference optical axis 31 which is aligned with the optical axis of light split from the beam splitter 16. Arranged on the reference optical axis 31 are a condenser lens 32 and a first end 33a of an optical fiber 33. A second end 33b of the optical fiber 33 is arranged in the vicinity of the light receiving section 40. A light receiving element 45 is arranged on the emission optical axis of the emitted light. Transmitted reference light irradiates the light receiving element 45 via the condenser lens 34.

The light receiving section 40 has a reception optical axis 41 which is aligned with an optical axis of reflected light that the distance measuring light is reflected from a measurement object. Arranged on the reception optical axis 41 are an objective lens 42 and a dichroic prism 43. The light receiving element 45 is arranged on a reflection optical axis 44 of the dichroic prism 43. Examples of the light receiving element 45 includes an avalanche photodiode (APD) or the like but are not limited to.

The ocular optical system 50 has an ocular optical axis 51 aligned with an extension line of the reception optical axis 41. The ocular optical system 50 is what is called a telescope having a focusing lens 52, an erecting prism 53, a collimation plate 54, and an ocular lens 55. The focusing lens 52 is attached movably back and forth to adjust the focus. The electing prism 53 is a prism for converting to an upright image such as a Porro prism. The collimation plate 54 is a transparent plate having a collimation line such as a cross, in other words, reticle. A user can collimate with the ocular lens 55 by visual observation.

Figure 2A:
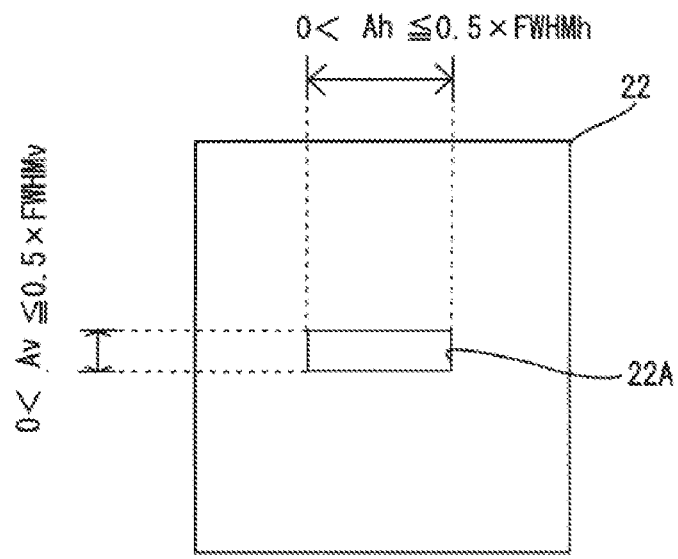
FIG. 2A illustrates one example of the aperture diaphragm for prism-mode measurement according to the first embodiment.
Figure 2B:
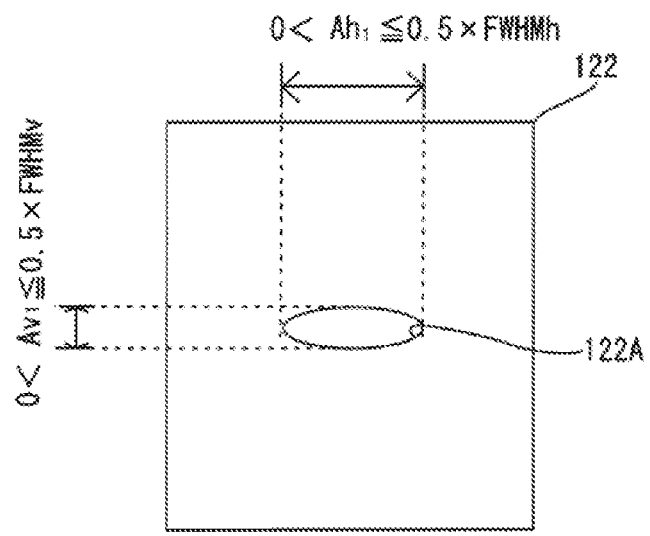
FIG. 2B illustrates another example of the aperture diaphragm according to the same embodiment.
Figure 3A:
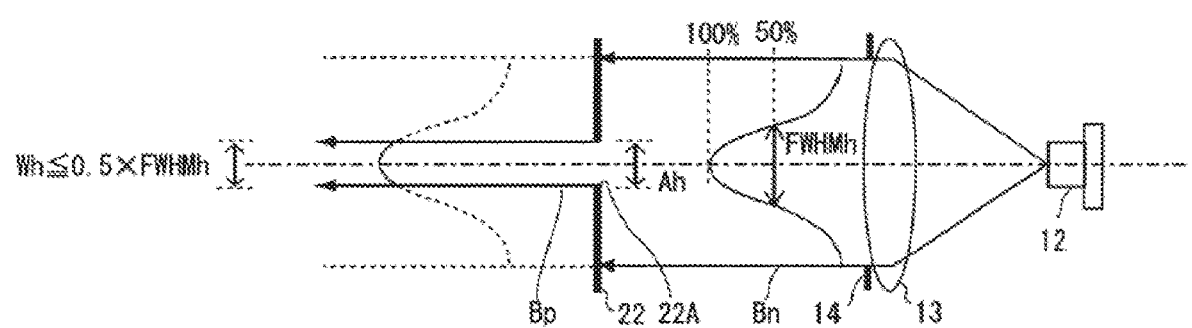
FIG. 3A is a plan view of a light emitting section.
Figure 3B:
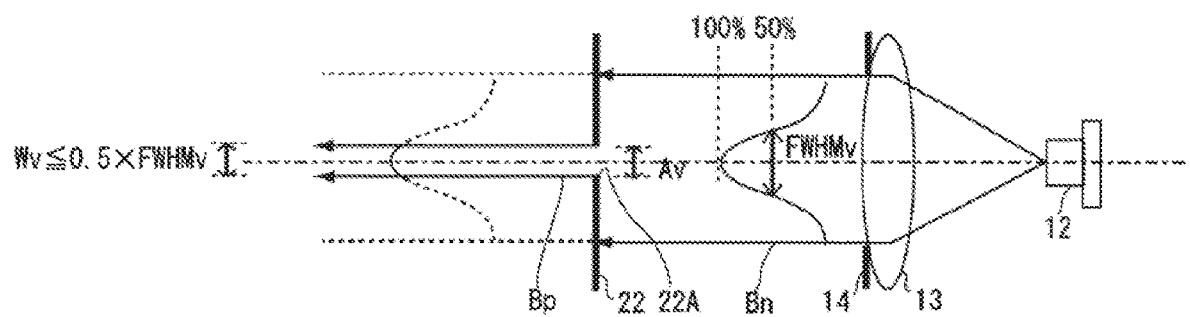
FIG. 3B is a side view of the light emitting section in the surveying instrument according to the first embodiment, and FIGS. 3A and 3B also illustrate a light flux around an aperture diaphragm.

Next, the main part of the present invention, the aperture diaphragm 22 will be described. FIG. 2A is a front view of the aperture diaphragm 22. FIGS. 3A and 3B are respectively a plan view and side view of the light emitting section 10 and light flux around the aperture diaphragm 22. The opening 22A of the aperture diaphragm 22 has a rectangular shape with a horizontal width Ah and a vertical width Av. As illustrated in FIG. 3A, on a horizontal cross section, the intensity distribution of a non-prism-distance-measurement beam Bn appears an intensity distribution in which the intensity is high at the center and it becomes lower as approaching a periphery. The horizontal width Ah of the opening 22A is set to be greater than 0 and not greater than 0.5 times the full width at a half maximum FWHMh of the intensity distribution in the horizontal cross-section of the non-prism-distance-measurement beam Bn. Also, as illustrated in FIG. 3B, on a vertical cross section, the intensity distribution of the non-prism-distance-measurement beam Bn appears an intensity distribution in which the intensity is high at the center and it becomes lower as approaching a periphery. The vertical width Av of the opening 22A is set to be greater than 0 and not greater than 0.5 times the full width at a half maximum FWHMv of the intensity distribution in the vertical cross section of the non-prism-distance-measurement beam Bn. The aperture diaphragm 22 limits a prism-distance-measurement beam Bp to the dimension of the opening 22A, that is, horizontally to the horizontal width Ah and vertically to the vertical width Av.

Thus, the horizontal beam width Wh of the prism-distance-measurement beam Bp is limited to the horizontal width Ah of the opening 22A, that is, limited to the range of greater than 0 and not greater than 0.5 times the full width at a half maximum FWHMh of the intensity distribution in the horizontal cross-section. This configuration provides an effect to limit the number of apertures (NA) of the collimating lens 13 to generally equalize the intensity distribution of the measurement distance light. Consequently, deviations of the light emission timing of the light in the beam of the distance measuring light in the light source is reduced, so that the mispointing error can be reduced.

Figure 4:
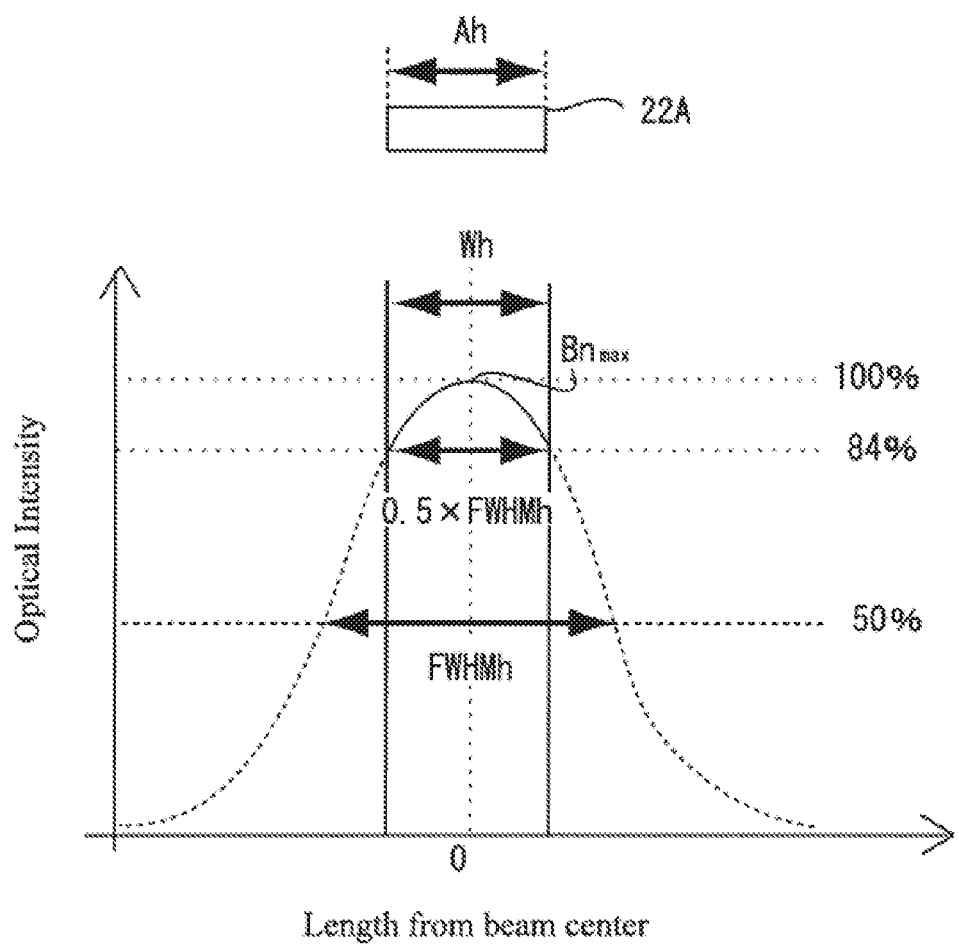
FIG. 4 is a diagram illustrating a relationship between a beam width and a beam intensity of a distance measuring light in the surveying instrument according to the first embodiment.

Further, as illustrated in FIG. 4, when the horizontal width Ah of the opening 22A is set to be 0.5 times the full width at half maximum FWHMh of the intensity distribution in the horizontal cross-section of the non-prism-distance-measurement beam Bn, the horizontal width Wh of the prism-distance-measurement beam Bp is limited to 0.5 times the full width at half maximum FWHMh of the intensity distribution in the horizontal cross-section of the non-prism-distance-measurement beam Bn. At this time, only light having an intensity of 84% or more of the peak intensity $Bn_{max}$ of the non-prism-distance-measurement beam Bn is emitted as the prism-distance-measurement beam Bp. The same applies to the vertical direction of the beam. Thus, setting the horizontal width Ah and the vertical width Av of the opening 22A to limit the prism-distance-measurement beam Bp to have intensities of 84% or more of the peak intensity $Bn_{max}$ of the non-prism-distance-measurement beam Bn respectively in the horizontal and vertical direction can limit the number of aperture of the collimating lens 13 to provide an effect of substantially equalizing the intensity distribution of the distance measuring light. Thereby, deviations of the light emitting timing in the beam of the distance measuring light is reduced, so that the mispointing error can be reduced.

Moreover, it is preferable that the horizontal width Wh and vertical width Wv of the prism distance measurement beam respectively meet the following inequalities:

$$3\times10^{-4} \leq \lambda/Wh < 1, \text{ and}$$

$$3\times10^{-4} \leq \lambda/Wv < 1,$$

wherein λ represents the wavelength of the distance measuring light.

As the values of "λ/Wh" and "λ/Wv" are set to be not smaller than $3\times10^{-4}$, the prism-distance-measurement beam Bp can moderately diverge, that is can diverge by at least not smaller than 2'. By contrast, if the values of "λ/Wh" and "λ/Wv" are set to be greater than 1, in other words, the horizontal width Wh and the vertical width Wv of the prism-distance-measurement beam Bp is smaller than the wavelength λ of the distance measuring light, the light cannot pass through the opening 22A to fail to be propagated. This configuration enables a stable measurement of the reflecting prism at a long distance even under the environment with atmospheric fluctuations.

Furthermore, as the opening 22A of the aperture diaphragm 22 has a rectangular shape, processing of the opening 22A is easy.

FIG. 3B illustrates another example of the aperture diaphragm. An opening 122A of an aperture diaphragm 122 has an ellipse shape. The shape of the opening 122A is generally similar to the shape of the non-prism-measurement beam Bn. The horizontal width $Ah_1$ and the vertical width $Av_1$ of the opening 122A is designed as depicted in FIG. 3B. This configuration enables the maximum utilization efficiency of the beam.

It should be noted that the aperture diaphragms 22, 122 are not limited to the above-described configuration of a board with an opening. The aperture diaphragms 22, 122 may be any type of diaphragms configured in such a way as to limit the beam diameter of the distance measuring light to the dimension of the openings 22A, 122A to suit to the prism-mode measurement. For example, an aperture diaphragm may be a diaphragm to partially shield the light by changing the transparency of light with elements to limit the beam shape. In addition, the shape of the opening is not limited to the above examples, and it can be designed to have any shape such as a circle, a square, a polygon or the like.

Figure 5:
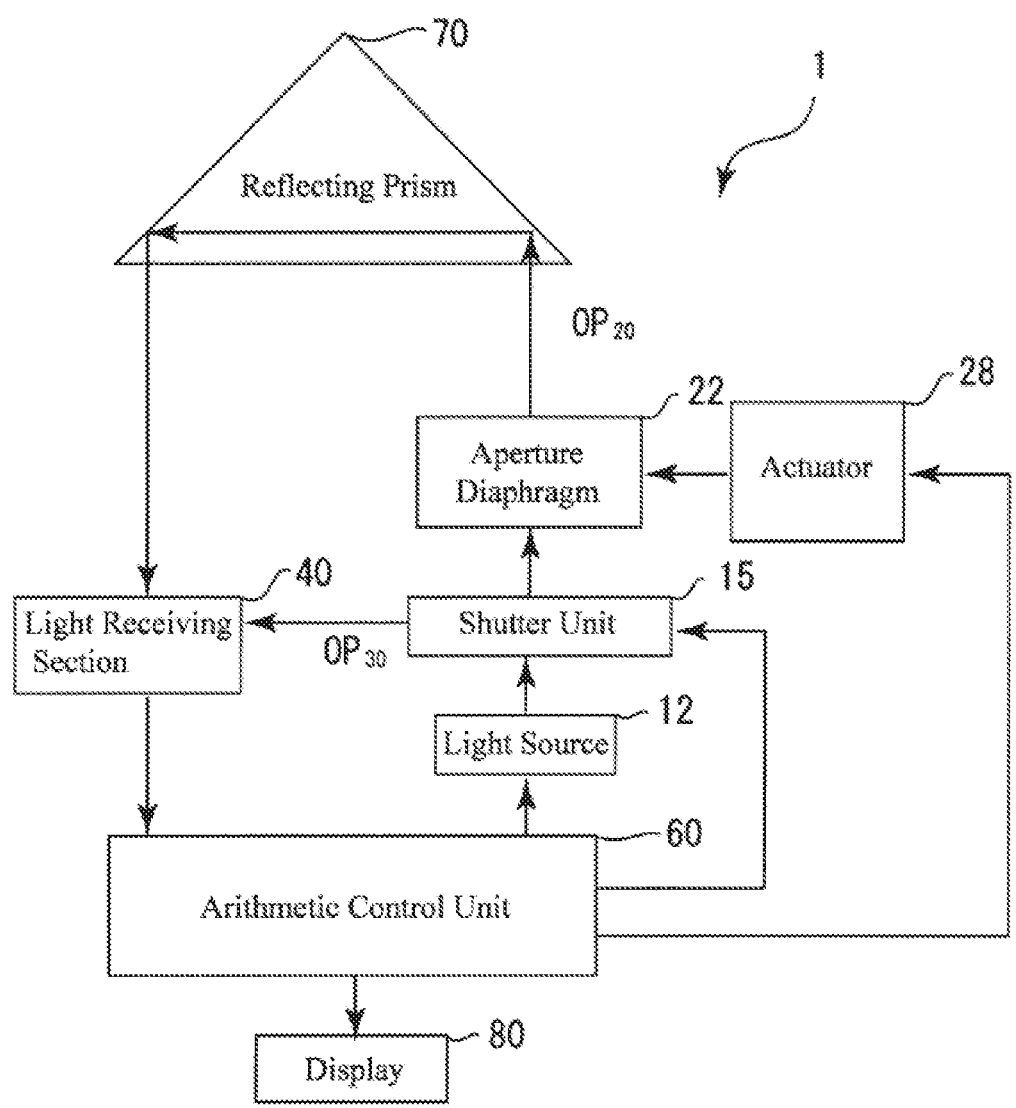
FIG. 5 is a block diagram illustrating an operation of the surveying instrument according to the first embodiment.

Hereinafter, with reference to FIGS. 1 and 5, the operation of the surveying instrument 1 will be described. Light emitted from the light source 12 according to a command from an arithmetic control unit 60 is collimated by the collimating lens 13 and guided to the shutter unit 15. The arithmetic control unit 60 controls the shutter unit 15 to select the distance-measurement optical path $OP_{20}$ or the reference optical-path $OP_{30}$. When the distance-measurement optical path $OP_{20}$ is selected, the light having passed through the shutter unit 15 is guided to the distance-measurement optical path $OP_{20}$ as the distance measuring light. Then, the light is irradiated to a reflecting prism 70 attached to a measurement object and reflected by the reflecting prism 70. Thereafter the light is guided to the light receiving element 45 through the objective lens 42 and the dichroic prism 43 in the light receiving section 40.

On the other hand, when the reference optical path $OP_{30}$ is selected, light branched by the shutter unit 15 as reference light is condensed by the lens 32 enters one end 33a of the optical fiber 33 and is emitted from the other end 33b of the optical fiber 33. Then, the light is condensed by the lens 34 and is guided to the light receiving element 45. The light receiving section 40 is connected to the arithmetic control unit 60. The arithmetic control unit 60 calculates the distance to the reflecting prism 70 on the basis of receiving light signals of the distance measuring light and the reference light. Results obtained by the calculation are displayed on a display 80. The signal of the reference light is used for correcting the fluctuation of the distance measurement value due to a temperature change or the like of the light source 12. Further, the arithmetic control unit 60 drives the actuator 28 to control insertion and retraction of the aperture diaphragm 22 and the dimming member 23 into the distance-measurement optical-path $OP_{20}$ as described below.

Figure 6:
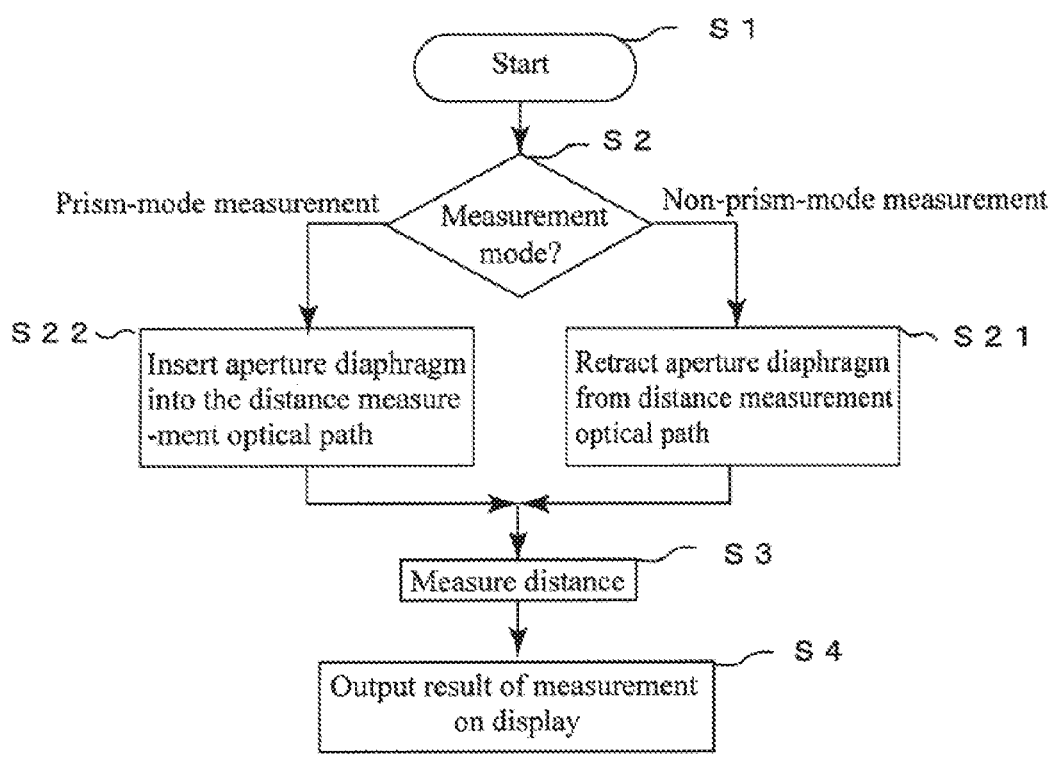
FIG. 6 is a flowchart of the measurement by use of the surveying instrument according to the first embodiment.

FIG. 6 is a flowchart illustrating a measurement method of the surveying instrument 1. First, a user starts the measurement in step S1, and then the user selects the measurement modes in step 2.

When the non-prism-mode measurement is selected in step S2, the processing proceeds to step S21, and the arithmetic control unit 60 drives the actuator to retract the aperture diaphragm 22 and the dimming member 23 from the distance-measurement optical path $OP_{20}$ (see the arrow Y in FIG. 1). As a result, the non-prism-distance-measurement beam Bn is emitted as collimated beam as represented by dashed lines in FIG. 1.

On the other hand, when the prism-mode measurement is selected in step S2, the processing proceeds to step S22, and the arithmetic control unit 60 drives the actuator to insert the aperture diaphragm 22 and dimming member 23 into the distance-measurement optical path $OP_{20}$ (see the arrow Y in FIG. 1). As a result, the beam width of the prism-distance-measurement beam Bp is limited to the width of the opening 22A of the aperture diaphragm 22 and the light amount of the prism-distance-measurement beam Bp is attenuated by the dimming member 23 to be suitable for the prism-mode measurement.

After step S21 or S22 is completed, the processing proceeds to step S3 and a distance measurement is performed. After completion of the distance measurement, the processing proceeds to step S4, and the arithmetic control unit 60 output the result of the distance measurement on the display to finish the measurement.

Second Embodiment

Figure 7A:
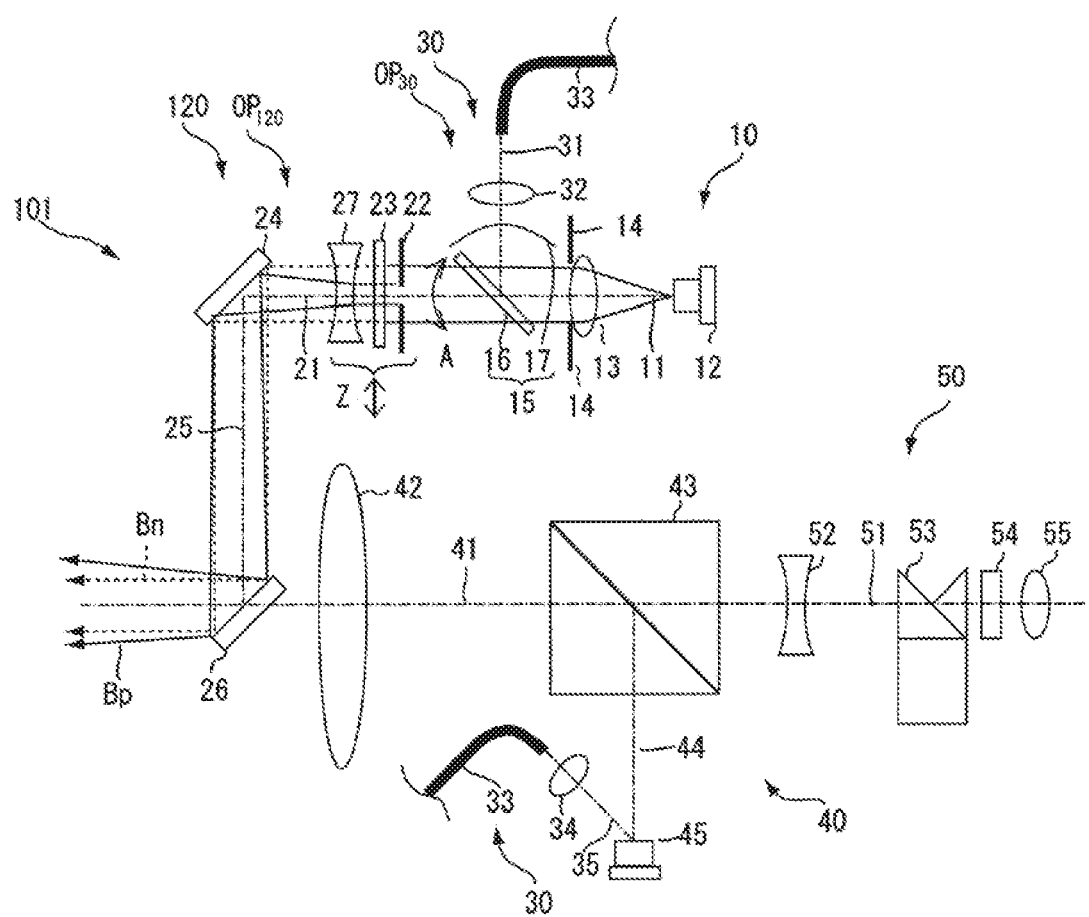
FIG. 7A is a diagram illustrating a configuration of an optical system in the surveying instrument according to the second embodiment of the present invention.

FIG. 7A is a diagram illustrating a configuration of an optical system in a surveying instrument 101 according to the second embodiment of the present invention. The surveying instrument 101 is configured such that a concave lens 27 is arranged on the distance-measurement optical path $OP_{120}$ downward of the aperture diaphragm 22, that is, a measurement object side of the aperture diaphragm 22, in the surveying instrument 1 according to the first embodiment. The concave lens 27 and the aperture diaphragm 22 are configured to be integrally inserted into the distance-measurement optical path $OP_{120}$ during a prism-mode measurement and integrally retracted from the distance-measurement optical path $OP_{120}$ during a non-prism-mode measurement (see the arrow Z). Accordingly, for the same elements in the first embodiment the same numerical references are assigned and the description therefor is omitted.

With this configuration, the distance measuring the beam diameter of which is limited by the aperture diaphragm 22 enters the concave lens 27 to be divergent light as represented by solid lines due to the action of the concave lens 27. As a result, the diameter of the beam irradiated to the reflecting prism 70 is expanded. Thereby, distance measurement of a prism at a long distance can be stably performed even under the environment with atmospheric fluctuations during measurement.

The arrangement of the concave lens 27 is not limited to the downward of the aperture diaphragm 22 on the distance-measurement optical path $OP_{120}$, but may be the upward of the aperture diaphragm 22, that is, on the light source 12 side of the aperture diaphragm 22, in the optical path $OP_{20}$.

Normally, when the lens is inserted into and retracted from the optical path, it is necessary to align the optical axis of the non-prism-distance-measurement beam with the optical axis of the prism-distance-measurement beam. So, it is necessary to adjust the position of the lens with respect to the aperture diaphragm 22. However, according to the above configuration, since the aperture diaphragm 22 and the concave lens 27 are integrally inserted into and retracted from the optical path, it is unnecessary to adjust the position of the concave lens 27 with respect to the aperture diaphragm 22. This configuration reduces the requirement for reproducibility of the inserting and ejecting positions compared with the case where the concave lens 27 is separately inserted and retracted.

Examples

Table 1 in FIG. 7B shows a simulation result of intensity distribution of the beam in the optical system according to the first embodiment. The simulation was performed under the condition that the horizontal width Wh and the vertical width Wv of the prism-distance-measurement beam Bp are respectively meet the following inequalities: $3 \times 10^{-4} \leq \lambda/Wh < 1$ and $3 \times 10^{-4} \leq \lambda/Wv < 1$, wherein $\lambda$ represents the wavelength of the light from the light source. In Example 1, used as the aperture diaphragm 22 was a board having a rectangular opening 22A with a horizontal width Ah of 0.5 times the full width at a half maximum FWHMh of the intensity distribution in the horizontal cross-section of the non-prism-measurement beam Bn and a vertical width Av of 0.5 times the full width at a half maximum FWHMv of the intensity distribution in the vertical cross-section of the non-prism measurement beam Bn. In Comparative Example 1, an aperture diaphragm 22 was not used. In other words, Example 1 shows a simulation result of the prism-mode measurement, and Comparative Example 1 shows a simulation result of the non-prism-mode measurement. In the table of FIG. 7B, the first row shows beam profiles immediate after the beams being emitted from the light emitting section 10, the second row shows beam profiles of the beams at a distance of 100 m from the light emitting section 10 and the third row shows intensity distribution of the beams shown in the second row, in the horizontal cross section of the beam.

Referring to Table 1, it can be understood from the first row that in Comparative Example 1, the collimating lens 13 with high NA efficiently receives the light emitted from the light source 12 to receive peripheral light of the light having an intensity distribution following the Gaussian distribution. Here, the utilization efficiency of light is about 90%.

On the other hand, in Example 1, the aperture diaphragm 22 having a long-sideways rectangular shape is inserted into the distance-measurement optical path $OP_{20}$ to corresponding to the light intensity distribution of the elliptic beam emitted from the light source 12. So, the beam widths, that is the horizontal width Wh and vertical width Wv, is respectively limited to 0.5 times the full width at half maximums FWHMh, FWHMv of the intensity distribution respectively in the horizontal direction and in the vertical direction.

As shown in the first row of Table 1, the intensity distribution of the beam immediately after being emitted from the light emitting section 10 appears just like as only the central portion of the intensity distribution of the beam in Comparative Example 1 is cut out. Further, from the second and third rows, it can be found that the beam is diffracted to diverge to 126 mm in the vertical direction and 60 mm in the horizontal direction, so as to diverge at least not smaller than 2' at a distance of 100 m from the light emitting section 10.

Figure 8A:
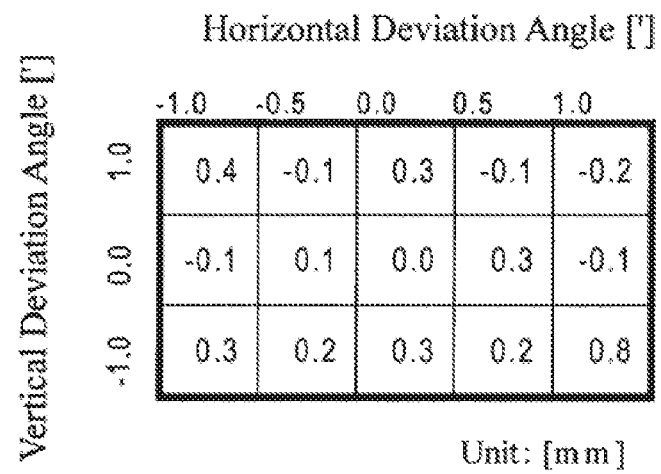
FIGS. 8A and 8B are tables showing mispointing errors when a prism is measured with a distance measuring light according to the first example of the present invention (FIG. 8A) and when the prism is measured with a distance measuring light according to the comparative example (FIG. 8B)
Figure 8B:
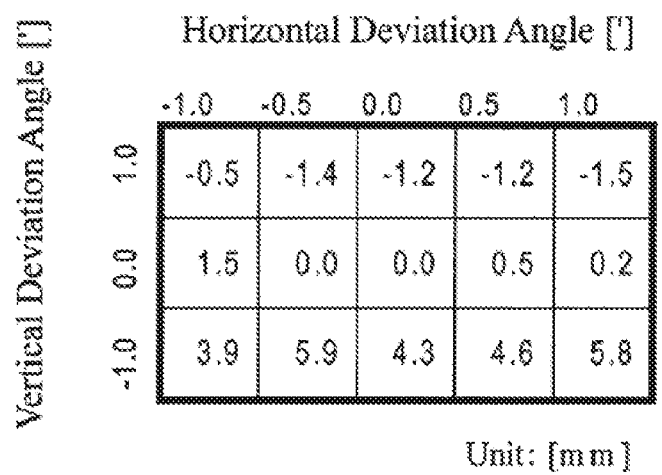
Figure 9:
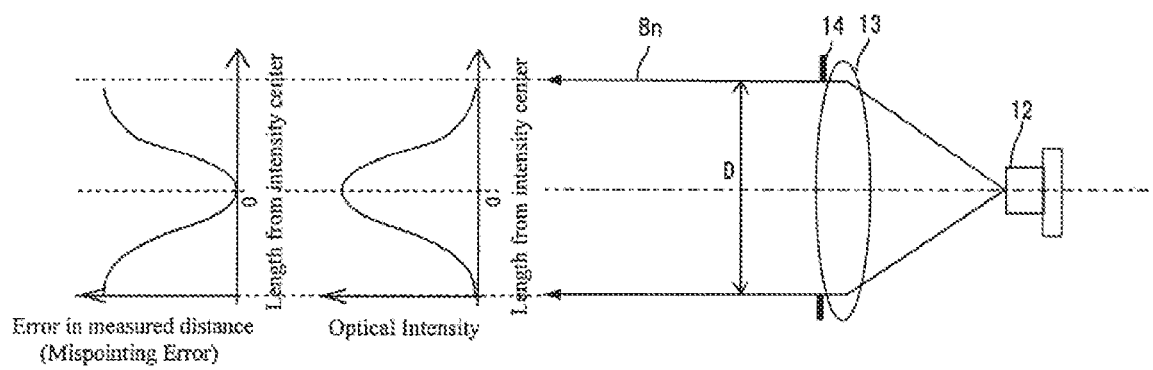
FIG. 9 is a diagram illustrating a correlation between light intensity and distribution of distance values when a prism is measured with a conventional non-prism measurement beam.

FIG. 8A represents the values of the mispointing errors when a reflecting prism is measured by use of the distance measuring light of Example 1. FIG. 8B represents the values of the mispointing errors when a reflecting prism is measured by use of the distance measuring light of Comparative Example 1. Errors in the case where the intensity center of the distance measuring light is deviated (mispointed) by the range of ±1' from the center of the reflecting prism in the vertical and horizontal direction are in the range of −1.5 mm to +5.8 mm in Comparative Example 1. By contrast, errors are reduced in the range of −0.2 mm to +0.8 mm in Example 1.

Figure 7C:
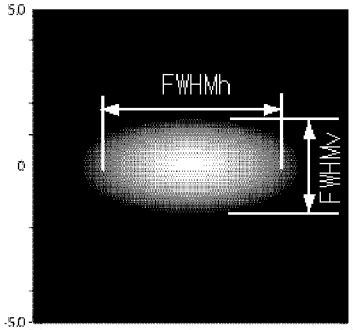
FIG. 7C is a table comparing beam profiles between Example 2 of the invention and Comparative Example 1.
Figure 7C:
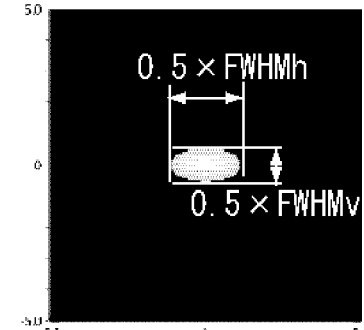

Table 2 of FIG. 7C also shows a simulation result of intensity distribution of the beam in the optical system according to the first embodiment. The simulation was also performed under the condition that the horizontal width Wh and the vertical width Wv of the prism-distance-measurement beam Bp are respectively meet the following inequalities: $3 \times 10-4 \leq \lambda/Wh < 1$ and $3 \times 10-4 \leq \lambda/Wv < 1$, wherein $\lambda$ represents the wavelength of the light from the light source.

However, in Example 2, used as the aperture diaphragm 122 was a board having an opening 122A in a shape illustrated in FIG. 3B with a horizontal width Ah of 0.5 times the full width at a half maximum FWHMh of the intensity distribution in the horizontal cross-section of the non-prism-measurement beam Bn and a vertical width Av of 0.5 times the full width at a half maximum FWHMv of the intensity distribution in the vertical cross-section of the non-prism measurement beam Bn. In Comparative Example 1, an aperture diaphragm 122 was not used. Pictures are beam profiles of the beams immediately after being emitted from the light emitting section.

From this result, it can be understood that forming the opening 122A of the aperture diaphragm 122 in a ellipse shape, which is generally similar to the shape of the non-prism-distance measurement beam limits a shape of a beam emitted from the aperture diaphragm in a ellipse shape, so that light having required intensity can be used with optimum efficiency.

Although the preferred embodiments of the present invention have been described above, the above-described Embodiments and Examples are just an example of the present invention, and these can be combined based on knowledge of those skilled in the art, and such forms are also included in the scope of the present invention.

REFERENCE NUMBER LIST

1,101 Surveying instrument
10 Light emitting section
20,120 Distance-measurement optical system
22,122 Aperture diaphragm
22A,122A Opening
27 Concave lens
40 Light receiving section

What is claimed is:

1. A surveying instrument comprising:
  a light emitting section for emitting distance measuring light having an intensity distribution in which the intensity is high at a center and it becomes lower as approaching a periphery;
  a light receiving section for receiving the distance measuring light via a measurement object; and
  a distance-measurement optical system for guiding the distance measuring light to the light receiving section via the measurement object,
  wherein the surveying instrument performs a prism-mode measurement and a non-prism-mode measurement,
  the distance-measurement optical system includes an aperture diaphragm,
  the aperture diaphragm is arranged in a distance-measurement optical-path during the prism mode measurement,
  an opening of the aperture diaphragm has
    a horizontal width of greater than 0 and not greater than 0.5 times a full width at half maximum of the intensity distribution in a horizontal cross section of a non-prism measurement beam, and a vertical width of greater than 0 and not greater than 0.5 times a full width at half maximum of the intensity distribution in a vertical cross section of the non-prism measurement beam.

2. The surveying instrument according to claim 1, wherein the horizontal width Wh and the vertical width Wv of the prism-distance-measurement beam respectively meet the following inequalities:

$$3 \times 10^{-4} \leq \lambda/Wh < 1, \text{ and}$$

$$3 \times 10^{-4} \leq \lambda/Wv < 1,$$

wherein λ represents a wavelength of the distance measuring light.

3. The surveying instrument according to claim 2, wherein a concave lens is configured to be inserted into a distance-measurement optical-path together with the aperture diaphragm during prism-mode measurement.

4. The surveying instrument according to claim 1, wherein a concave lens is configured to be inserted into the distance-measurement optical-path together with the aperture diaphragm during the prism-mode measurement.

5. The surveying instrument according to claim 1, wherein the aperture diaphragm is formed in a rectangular shape.

6. The surveying instrument according to claim 1, wherein the aperture diaphragm is formed in an ellipse shape.

7. A surveying instrument comprising:

a light emitting section for emitting distance measuring light having an intensity distribution in which the intensity is high at a center and it becomes lower as approaching a periphery;

a light receiving section for receiving the distance measuring light via a measurement object; and a distance-measurement optical system for guiding the distance measuring light to the light receiving section via the measurement object, wherein the surveying instrument performs a prism-mode measurement and a non-prism-mode measurement, the distance-measurement optical system includes an aperture diaphragm, the aperture diaphragm is arranged in a distance-measurement optical-path during the prism mode measurement, and the aperture diaphragm limits a prism distance measurement beam to have an intensity of more than 84% of a center intensity of a non-prism distance measurement beam.

8. The surveying instrument according to claim 7, wherein the horizontal width Wh and vertical width Wv of the prism distance measurement beam respectively meet the following inequalities:

$$3 \times 10^{-4} \leq \lambda/Wh < 1, \text{ and}$$

$$3 \times 10^{-4} \leq \lambda/Wv < 1,$$

wherein λ represents a wavelength of the distance measuring light.

9. The surveying instrument according to claim 8, wherein a concave lens is configured to be inserted into the distance-measurement optical-path together with the aperture diaphragm during the prism-mode measurement.

10. The surveying instrument according to claim 7, wherein a concave lens is configured to be inserted into the distance-measurement optical-path together with the aperture diaphragm during the prism-mode measurement.

11. The surveying instrument according to claim 7, wherein the aperture diaphragm is formed in a rectangular shape.

12. The surveying instrument according to claim 7, wherein the aperture diaphragm is formed in an ellipse shape.

* * * * *